United States Patent
Wright et al.

[11] Patent Number: 5,982,550
[45] Date of Patent: Nov. 9, 1999

[54] VIEWING ANGLE LENS

[75] Inventors: Charles Wright, Decatur; John VanDerlofske, Huntsville, both of Ala.; Dewayne E. Green, Winchester, Tenn.; Douglas L. Brundage, Hazel Green, Ala.

[73] Assignee: Chrylser Corporation, Auburn Hills, Mich.

[21] Appl. No.: 09/098,874

[22] Filed: Jun. 17, 1998

[51] Int. Cl.[6] .................................................. G02B 27/10
[52] U.S. Cl. ................................ 359/618; 345/7; 340/705
[58] Field of Search ............................. 359/618; 340/461

[56] References Cited

U.S. PATENT DOCUMENTS

| | | |
|---|---|---|
| 3,662,040 | 5/1972 | Urbach et al. ............................ 264/2.1 |
| 3,950,072 | 4/1976 | Aten . |
| 4,529,268 | 7/1985 | Brown ..................................... 350/276 |
| 4,548,480 | 10/1985 | Yamamoto et al. ..................... 350/432 |
| 4,556,877 | 12/1985 | Kumagai et al. . |
| 4,623,882 | 11/1986 | Nixon . |
| 4,683,491 | 7/1987 | Shimada et al. . |
| 4,884,870 | 12/1989 | Klein et al. . |
| 4,973,942 | 11/1990 | Iino . |
| 4,988,976 | 1/1991 | Lu . |
| 5,005,009 | 4/1991 | Roberts . |
| 5,034,734 | 7/1991 | Iguchi . |
| 5,070,323 | 12/1991 | Iino et al. . |
| 5,121,099 | 6/1992 | Hegg et al. . |
| 5,198,797 | 3/1993 | Daidoji . |
| 5,321,550 | 6/1994 | Maruyama et al. ..................... 359/618 |
| 5,327,154 | 7/1994 | Aoki . |
| 5,334,995 | 8/1994 | Iino . |
| 5,361,165 | 11/1994 | Stringfellow et al. . |
| 5,461,361 | 10/1995 | Moore . |
| 5,467,103 | 11/1995 | Iino et al. . |
| 5,513,037 | 4/1996 | Yoshida et al. ......................... 359/457 |
| 5,535,056 | 7/1996 | Caskey et al. .......................... 359/603 |
| 5,563,622 | 10/1996 | Person et al. . |
| 5,608,837 | 3/1997 | Tai et al. ................................. 385/146 |
| 5,650,815 | 7/1997 | Dasso ........................................ 348/42 |
| 5,808,804 | 9/1998 | Moskovich ............................. 359/649 |
| 5,846,457 | 12/1998 | Hoffman ................................. 264/2.1 |

*Primary Examiner*—Georgia Epps
*Assistant Examiner*—Timothy J Thompson
*Attorney, Agent, or Firm*—Roland A. Fuller III

[57] ABSTRACT

The present invention provides a secondary lens between the display lens and the vacuum florescent display. Both the lenses have an index of refraction greater than 1 which results in a momentary change in the viewing angle while the light passes through each lens. Since two lenses are used, the overall effective lens thickness for effective light shifting is increased while the cross sectional thickness of each lens remains uniform. Preferably, each lens is made of a polycarbonate material and has an index of refraction of 1.59. In another aspect of the present invention, the display lens is constructed of a smoke material and the secondary lens is clear.

12 Claims, 1 Drawing Sheet

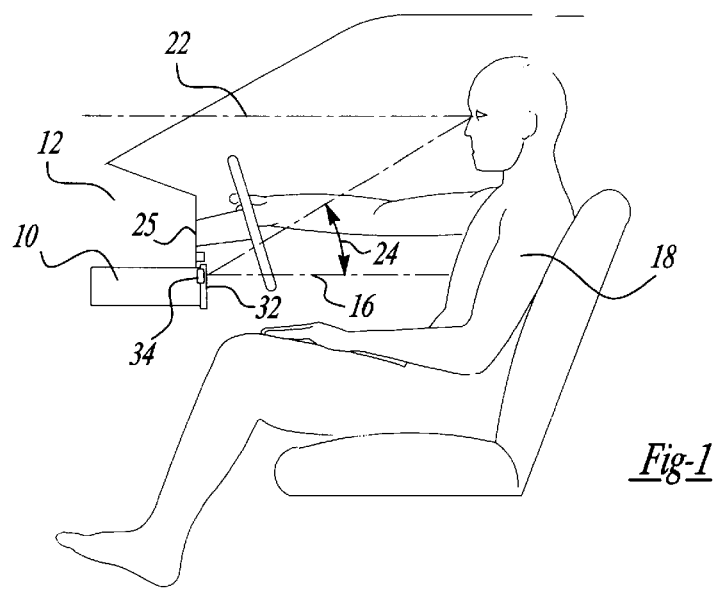
*Fig-1*
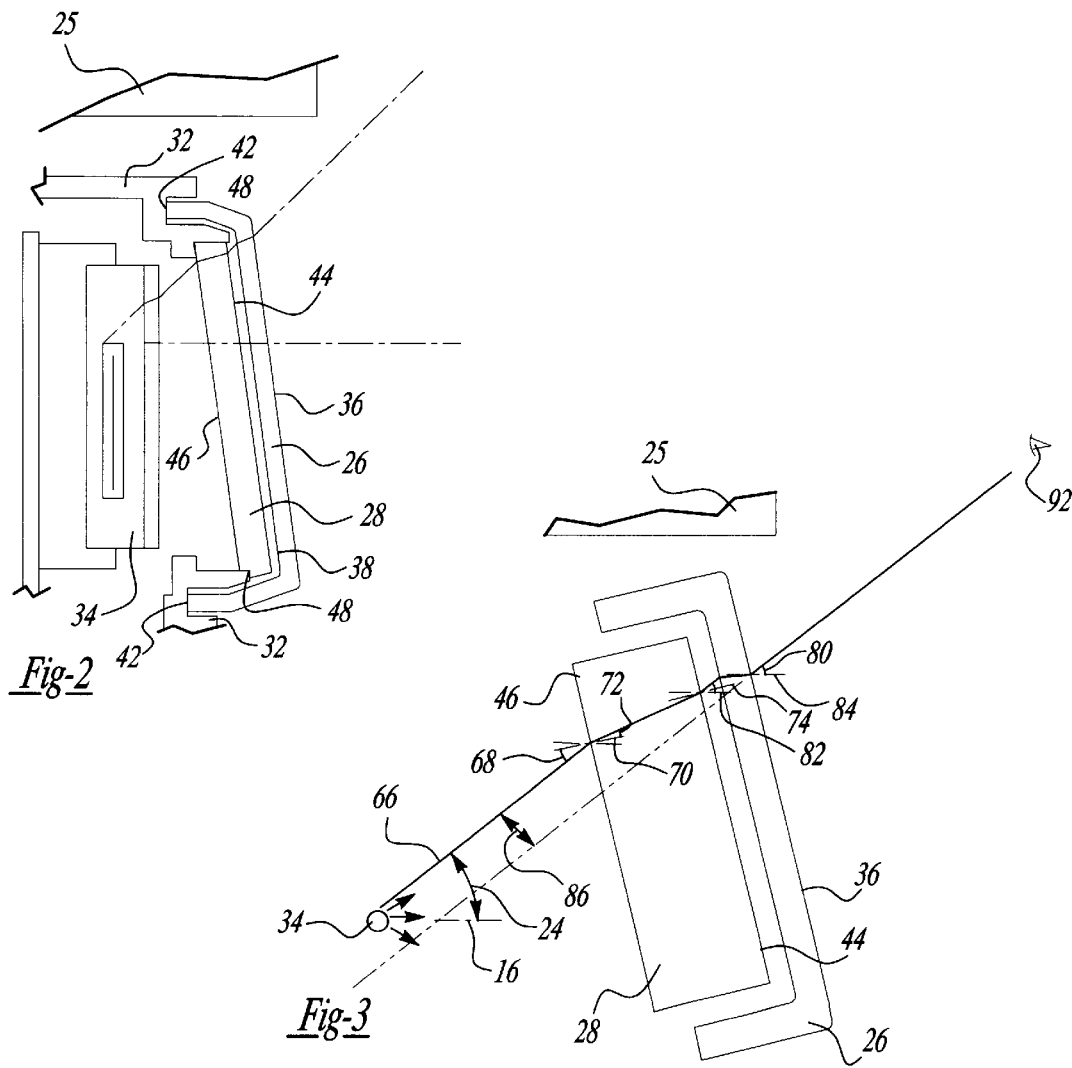
*Fig-2*
*Fig-3*

VIEWING ANGLE LENS

BACKGROUND OF THE INVENTION

I. Technical Field

The present invention relates generally to a viewing angle lens and, more particularly, to a viewing angle lens which changes the viewing angle of a vacuum fluorescent display of an accessory in a motor vehicle.

II. Disscusion

Typically, vehicle accessories are flush or recess mounted in the dashboards of automobiles at a level such that light emitted from the accessory display is projected horizontally into a vehicle occupant's midsection. As a result of this low level positioning, the vehicle occupant usually reads information provided by an accessory display at an angle; this angle is known as the viewing angle. By increasing the viewing angle, a manufacturer can either lower the positioning or increase the recess of the accessory on the dashboard. In the field of manufacturing, lower placement or recessed positioning of accessories on dashboards has certain manufacturing advantages. However, because of lower mounting, protrusions from the dashboard or walls of the cavity where the accessory is placed sometimes interfere with light being emitted at an angle from the accessory display. This can obstruct the vehicle occupant's view of the display. To allow the vehicle occupant to view the accessory, the viewing angle must be reduced or the accessory must be placed higher on the dashboard.

In an attempt to increase the viewing angle of a flush mounted accessory while not obstructing the vehicle occupant's view of the accessory, accessory displays, such as vacuum florescent displays, have been fitted with a display lens which has an index of refraction greater than 1. This lens bends the light emitted from the accessory horizontally while traveling through the lens. When the light exits the lens, it is bent back to its original viewing angle. In essence, the lens shifts the light outward by a distance proportional to the thickness of the lens. This shifting is designed to move the light outward, past any obstructions. Because the light is effectively shifted as a function of the thickness of the lens, thicker lenses allow greater shifting of light from an accessory.

However, certain problems exist in increasing the thickness of the display lens. First, some display lenses are tinted. Tinting is a process by which the clear plastic is colored with a darker material. This coloring causes the display lens to have a darker appearance. The darker appearance reduces the brightness of light which passes through it. By increasing the thickness of the display lens, the amount of tinted material is increased which greatly reduces the illumination of the vacuum florescent display. This illumination may be reduced to a point lower than what is acceptable for the vehicle occupant to read the information provided by the display. Second, conventional assembly methods in radio assembly place a limit on how thick the display lens can be. If the thickness of the display lens is to be increased past this limit, the display lens will no longer have a uniform thickness which will result in certain areas being thick and other areas being thinner. This non-uniform thickness is undesirable from a manufacturing standpoint. In the casting process, non-uniform thickness of materials which are being cast can create hot spots. These hot spots usually result in poor strength and quality characteristics. The present invention overcomes these drawbacks.

SUMMARY OF THE INVENTION

The present invention overcomes these drawbacks by providing a secondary lens between the display lens and the vacuum florescent display. Both the lenses have an index of refraction greater than 1 which results in a momentary change in the viewing angle while the light passes through each lens. Since two lenses are used, the overall effective lens thickness for effective light shifting is increased while the cross sectional thickness of each lens remains uniform. Preferably, each lens is made of a polycarbonate material and has an index of refraction of 1.59. In another aspect of the present invention, the display lens is constructed of a smoke material and the secondary lens is clear.

Additional advantages and features of the present invention will be apparent from the subsequent description and the appended claims taken in conjunction with the accompanying drawings.

BRIEF DESCRIPTION OF THE DRAWINGS

In the drawings which illustrate the best mode presently contemplated for carrying out the present invention:

FIG. 1 is a diagrammatical view of the viewing angle of a flush mounted accessory in relation to a vehicle driver;

FIG. 2 is a cross sectional view of a viewing angle lens according to the present invention; and FIG. 3 is a diagrammatical view of a viewing angle lens according to the present invention.

DETAILED DESCRIPTION OF THE PREFERRED EMBODIMENTS

With reference to FIG. 1, a typical accessory such as a radio 10 is shown flush mounted in vehicle dashboard 12. The radio 10 has a vacuum florescent display 34 which emits illuminated information, such as the current radio station and time of day in a direction as shown at line 16. A vehicle occupant 18 is in a seated position and has a line of sight 22. Thus, when the vehicle occupant 18 desires to read the information displayed on the vacuum florescent display 34, the vehicle occupant 18 must look at vacuum florescent display 34 at viewing angle 24. As viewing angle 24 is increased, protrusion 25 obstructs the light emitted from vacuum florescent display 34. Thus, vehicle occupant 18 can no longer discern the information therefrom. Between 0° and 90°, there lies a maximum viewing angle 24 where vehicle occupant 18 can still discern information from vacuum florescent display 34 without obstruction. This angle is hereinafter referred to as the "maximum viewing angle".

Referring to FIG. 2, the present invention is now described. The present invention generally includes display lens 26, secondary lens 28, radio bezel 32 and vacuum florescent display 34. Display lens 26 preferably has a cross sectional thickness of a few millimeters and preferably has surface 36 having a concave shape, and surface 38 having a convex shape. However, as will become apparent, surface 36 and surface 38 may be of any suitable shape for optics such as concave or convex providing that both surfaces are parallel to one another at each point along their respective surfaces. Display lens 26 is preferably made of a polycarbonate material and preferably has an index of refraction of 1.59. Display lens 26 is preferably clear with a slight smoky consistency to reduce the illumination of vacuum florescent display 34. Display lens 26 is attached to radio bezel 32 at ends 42. This attachment may be by glue, sonic welded or any other suitable adhesive. Secondary lens 28 preferably has surface 44 having a concave shape and surface 46 having a convex shape. As before, surface 44 and surface 46 may be of any suitable shape for optics such as concave or convex providing that both surfaces are parallel to one another at each point along their respective surfaces. Like display lens 26, secondary lens 28 is preferably made of a polycarbonate material with an index of refraction of 1.59. Secondary lens 28 is attached to radio bezel 32 at ends 48 by adhesive, or mechanical means such as sonic welding, staking, etc.

Vacuum florescent display 34 is located behind secondary lens 28 as shown. Vacuum florescent display 34 includes illuminated numbers (not shown) which show pertinent information. Preferably, vacuum florescent display is a radio display which shows the current radio station, time and other pertinent radio information.

Referring to FIG. 3, the present invention is now described. Vacuum florescent display 34 emits a ray of light 66. Ray 66 travels from vacuum florescent display 34 at a viewing angle 24 to surface 46 of secondary lens 28. Secondary lens 28 having a larger index of refraction than the surrounding ambient air bends ray 66 as shown. Ray 66 enters surface 46 at angle 68 with line 70. Line 70 is a line normal to surface 46. Due to the index of refraction of secondary lens 28, ray 66 is bent to angle 72 with line 70. The properties of light traveling through optical elements such as these are governed by Snell's law which states that N68 sin(angle 68)=N72 sin(angle 72) where N68 is the index of refraction of the material of the side of angle 68 and N72 is the index of refraction of the material on the side of angle 72. Snell's law and the properties of light traveling through optical elements are well known in the art and is therefore not discussed in great detail. Light ray 66 next travels through surface 44 of secondary lens 28. After traveling through surface 44, ray 66 forms an angle 74 with horizon line 82 which is parallel to line 16 (see FIG. 1). Because surface 44 is parallel to surface 46, angle 74 is equal to viewing angle 24 due, once again, to Snell's law. Ray 66 next travels through display lens 26 and follows a similar path as through secondary lens 28 for reasons as discussed previously. Ray 66 exits surface 36 at angle 80 with horizon line 84. Like before, angle 80 is equal to viewing angle 24. Thus, the portion of ray 66 exiting surface 36 is parallel to the portion of ray 66 traveling from vacuum florescent display 34 to surface 46. However, the portion of ray 66 exiting surface 36 is displaced by distance 86 from the portion of ray 66 traveling from vacuum florescent display 34 to surface 46. By this way, ray 66 is shifted by distance 86 such that it clears protrusion 25, while maintaining its viewing angle 24, and travels to human eye 92 of vehicle occupant 18 (see FIG. 1). It is noted that each ray emitted from vacuum florescent display 34 which intersects surface 46 follows a similar path to that just discussed.

While the above detailed described the preferred embodiment of the present invention, it should be understood that the present invention is susceptible to modification, variation and alteration without deviating from the scope and fair meaning of the sub-adjoined claims.

What is claimed is:

1. A lens system for a vacuum fluorescent display, comprising:

a first lens having a first index of refraction, said first index of refraction being larger than an index of refraction of ambient air;

a secondary lens having a second index of refraction, said secondary lens positioned rearward of and spaced from said first lens, said second index of refraction being larger than said index of refraction of ambient air;

said vacuum fluorescent display mounted in an instrument panel of a vehicle, said vacuum fluorescent display positioned under a protrusion such that said protrusion obstructs some light being emitted from said vacuum fluorescent display, said vacuum fluorescent display positioned rearward and spaced from said secondary lens; and said first lens and said secondary lens bending at least some of said light obstructed by said protrusion around said protrusion to increase a maximum viewing angle of said vacuum fluorescent display.

2. The lens system as claimed in claim 1, wherein the second index of refraction is less than the first index of refraction.

3. The lens system as claimed in claim 1, wherein the second lens is made of polycarbonate.

4. The lens system as claimed in claim 1, wherein the first lens is made of polycarbonate.

5. The lens system as claimed in claim 1, wherein said first lens and said second lens have cross sections of uniform thickness.

6. The lens system as claimed in claim 1, wherein said first lens and said second lens are supported in said instrument panel by a radio bezel.

7. The lens system as claimed in claim 1, wherein said vacuum fluorescent display is a radio display.

8. The lens system as claimed in claim 1, wherein the first lens is made of a smoked material such that light exiting the first lens has a lower brightness than light entering the first lens, the second lens being made of a clear material such that light exiting the second lens maintains substantially the same brightness as light entering the second lens.

9. The lens system as claimed in claim 1, further comprising said vehicle, said vacuum fluorescent display mounted in said vehicle at a level substantially lower than a line of sight of an occupant seated in said vehicle.

10. The lens system as claimed in claim 9, wherein said vehicle is an automobile.

11. A lens system for a vacuum fluorescent display, comprising:

at least a first lens having a first index of refraction, said first index of refraction being larger than an index of refraction of ambient air;

said vacuum fluorescent display, said vacuum fluorescent display mounted in an instrument panel of a vehicle and positioned rearward and spaced from said first lens, said vacuum fluorescent display positioned under a protrusion such that said protrusion obstructs some light being emitted from said vacuum fluorescent display; and said first lens bending at least some of said light obstructed by said protrusion around said protrusion to increase a maximum viewing angle of said vacuum fluorescent display.

12. An automobile accessory adapted to be mounted in an instrument panel of an automobile, said automobile accessory comprising:

a first lens having a first index of refraction, said first index of refraction being larger than an index of refraction of ambient air; and a secondary lens having a second index of refraction, said secondary lens positioned rearward of and spaced from said first lens, said second index of refraction being larger than said index of refraction of ambient air.

* * * * *